United States Patent
Novoselsky et al.

[11] Patent Number: 6,100,809
[45] Date of Patent: Aug. 8, 2000

[54] BEARING WEAR DETECTION SYSTEM

[75] Inventors: Yefim Novoselsky, Old Bridge; Samuel Hsieh, Marlboro; Ratan Guha, Oakhurst; Muthu Murugan, Howell; Leon Kasdan, West Long Branch, all of N.J.

[73] Assignee: AlliedSignal Inc., Morristown, N.J.

[21] Appl. No.: 09/200,379

[22] Filed: Nov. 24, 1998

[51] Int. Cl.[7] .................................................. G08B 21/00
[52] U.S. Cl. ........................ 340/682; 340/648; 384/499; 384/513
[58] Field of Search .............................. 340/682, 870.63, 340/870.3, 648, 683; 384/446, 448, 276, 282, 420, 624, 499, 500, 449, 513

[56] References Cited

U.S. PATENT DOCUMENTS

| | | | |
|---|---|---|---|
| 3,508,241 | 4/1970 | Potter | 340/269 |
| 4,063,786 | 12/1977 | Rall | 308/1 A |
| 4,074,575 | 2/1978 | Bergman | 73/344 |
| 4,167,734 | 9/1979 | Logan et al. | 340/682 |
| 4,237,454 | 12/1980 | Meyer | 340/682 |
| 4,425,010 | 1/1984 | Bryant et al. | 308/227 |
| 4,584,865 | 4/1986 | Hutchins | 73/7 |
| 4,641,978 | 2/1987 | Kapich | 384/102 |
| 4,875,785 | 10/1989 | Santos | 384/448 |
| 4,924,180 | 5/1990 | Nasr et al. | 324/207.15 |
| 5,602,437 | 2/1997 | Shahamat | 310/90 |
| 5,796,349 | 8/1998 | Klein | 340/682 |
| 5,805,080 | 9/1998 | Lemoine et al. | 340/870.16 |

*Primary Examiner*—Daniel J. Wu
*Assistant Examiner*—Toan Pham
*Attorney, Agent, or Firm*—William J. Zak, Jr., Esq.

[57] ABSTRACT

A bearing detection system for an electrical generator (10) includes auxiliary bearings (29) for supporting a rotating shaft (39) upon failure of main bearings (62). The auxiliary bearings (29) are mounted on the shaft and have a slight gap (64) between their outside diameters and bearing liners 33. The gap corresponds to the main bearing permissible wear. During normal functioning of the main bearing, the auxiliary bearing frame (34) rotates with the shaft and a magnet (35) with a small clearance between its face and auxiliary bearing outer ring (32) forces the synchronized rotation of inner (37) and outer (32) races. The auxiliary bearing outer ring or race (32) has a coaxial groove (31) on its outer diameter and a detection sensor (30), mounted on the bearing liner, gives a signal per rotation of the shaft to a control circuit (40). The control circuit (40) determines the rotational status of the auxiliary bearings outer ring (32) by counting the number of impulses generated by the circuit (40) when the groove crosses the sensor's magnetic fields. The circuit (40) detects the moment when any auxiliary bearing comes in contact with the bearing liner and results in no impulses being generated. The outer ring (32) stops rotating as the main bearing wear depth reaches the predetermined limit. In this case, the circuit (40) triggers the failure signal (71) to indicate that the main bearings need replacement.

9 Claims, 3 Drawing Sheets

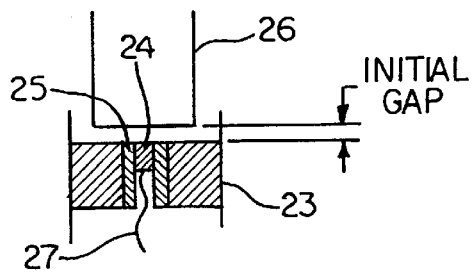
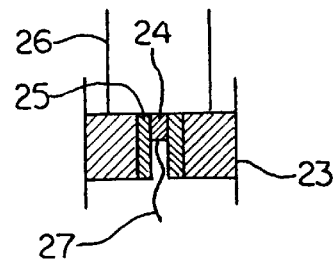
FIG. 2b PRIOR ART
FIG. 2d PRIOR ART
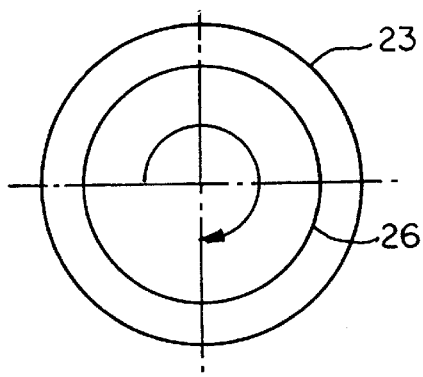
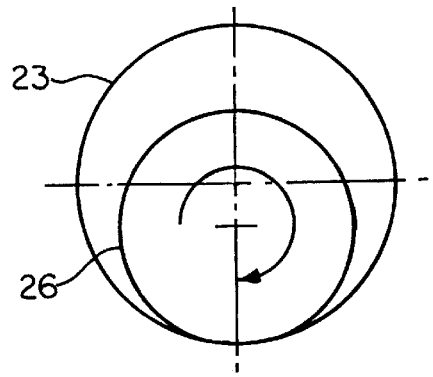
FIG. 2a PRIOR ART
FIG. 2c PRIOR ART
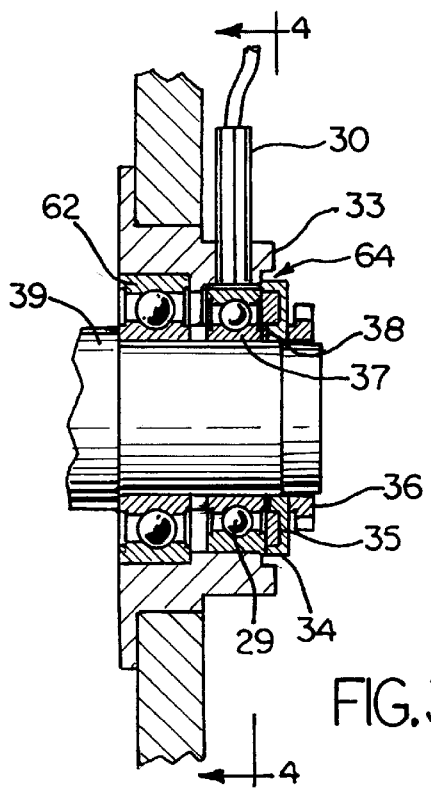
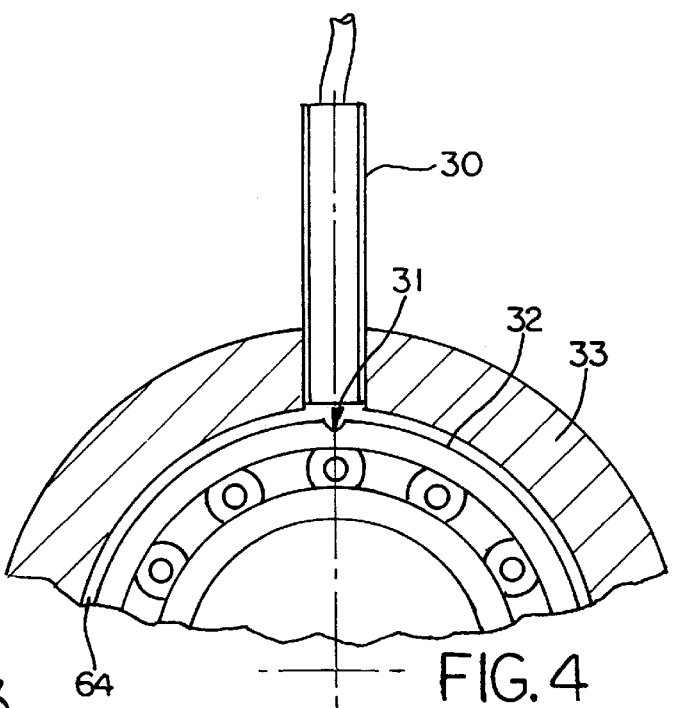
FIG. 3
FIG. 4

BEARING WEAR DETECTION SYSTEM

The present invention relates generally to systems for monitoring bearing wear and more particularly to the monitoring of bearing systems where a shaft is supported by main bearings under normal operating conditions and backed-up by auxiliary bearings upon the main bearing's failure. A presently preferred implementation of the invention is in connection with aircraft electrical generators.

In such applications, the main bearings are considered operable until a wear detection system warns the pilot that it is the right time for bearing replacement. This reduces the unnecessary regular replacement of the bearings and, at the same time, eliminates the danger of costly and catastrophic failure of the bearings and generator, thus saving time and cost, and enhancing safety.

Numerous auxiliary bearing systems and wear sensors are known. For, example, one known detection system employs, for each auxiliary bearing, a liner having a metal ring which is electrically insulated by a pair of surrounding disks. A ground wire for a signal lamp in the cockpit is connected to the metal ring. This ground wire remains open until the main bearing has worn sufficiently to allow the outer race of the auxiliary bearing to touch the ring. The auxiliary bearing failure signal light comes on when the ground line is closed. The inside surface of the liner ring and disks is typically covered by a thin (0.001 inch) film of insulating material, such as Heresite to protect against false signals if a foreign metal particle happens to get into the gap and close the circuit. Several other resistance monitoring schemes for determining when a back-up bearing outer race has come into contact with a stator have been suggested.

A somewhat different approach is illustrated by U.S. Pat. No. 4,641,978 which discloses a back-up bearing system for a rotatable shaft where, upon detection of primary bearing failure the shaft is axially shifted to bring the auxiliary or back-up bearings into operation. In this patented arrangement, bearing failure is detected by shaft displacement sensors which respond to failure indicative increased shaft vibration.

Some existing detection systems have been rendered unreliable due to two unpredictable failure modes. A false bearing failure signal may occur while the main bearings are still in good condition, or no bearing failure signal may occur when one of the main bearings has failed. The causes for such failures include moisture, temperature, atmospheric pressure, fan airflow, foreign particles, and the insulating film on the liners being either too thin or too thick.

There is a demand for a compact, economical bearing wear sensing system of enhanced reliability.

The present invention provides solutions to the above problems by utilizing the outer race of the auxiliary bearing as the rotor of a generator and triggering an alarm if this generator output falls below a predetermined threshold.

In accordance with one form the invention, a rotating machine having a rotor and a stator has main bearings and at least one normally inoperative auxiliary bearing which becomes operable and participates in journalling the rotor upon sufficient wear or failure of one of the main bearings. The auxiliary bearing has an inner race fixed to the machine rotor and an outer race which rotates freely with the inner race when the bearing is inoperative. The time at which the auxiliary bearing begins to participate in journalling the rotor is determined by deriving a signal indicative of outer race rotation during machine operation and providing an alarm indication if the derived signal falls below a predetermined threshold.

BRIEF DESCRIPTION OF THE DRAWING

FIGS. 2a–d illustrate one prior bearing wear sensing scheme;

FIG. 3 is a view in cross-section of a primary bearing and auxiliary bearing having an improved primary bearing wear sensor according to the present invention;

FIG. 4 is a partial cross-sectional view along lines 4—4 of FIG. 3; and

Corresponding reference characters indicate corresponding parts throughout the several views of the drawing.

DESCRIPTION OF THE PREFERRED EMBODIMENT

Figure 1:
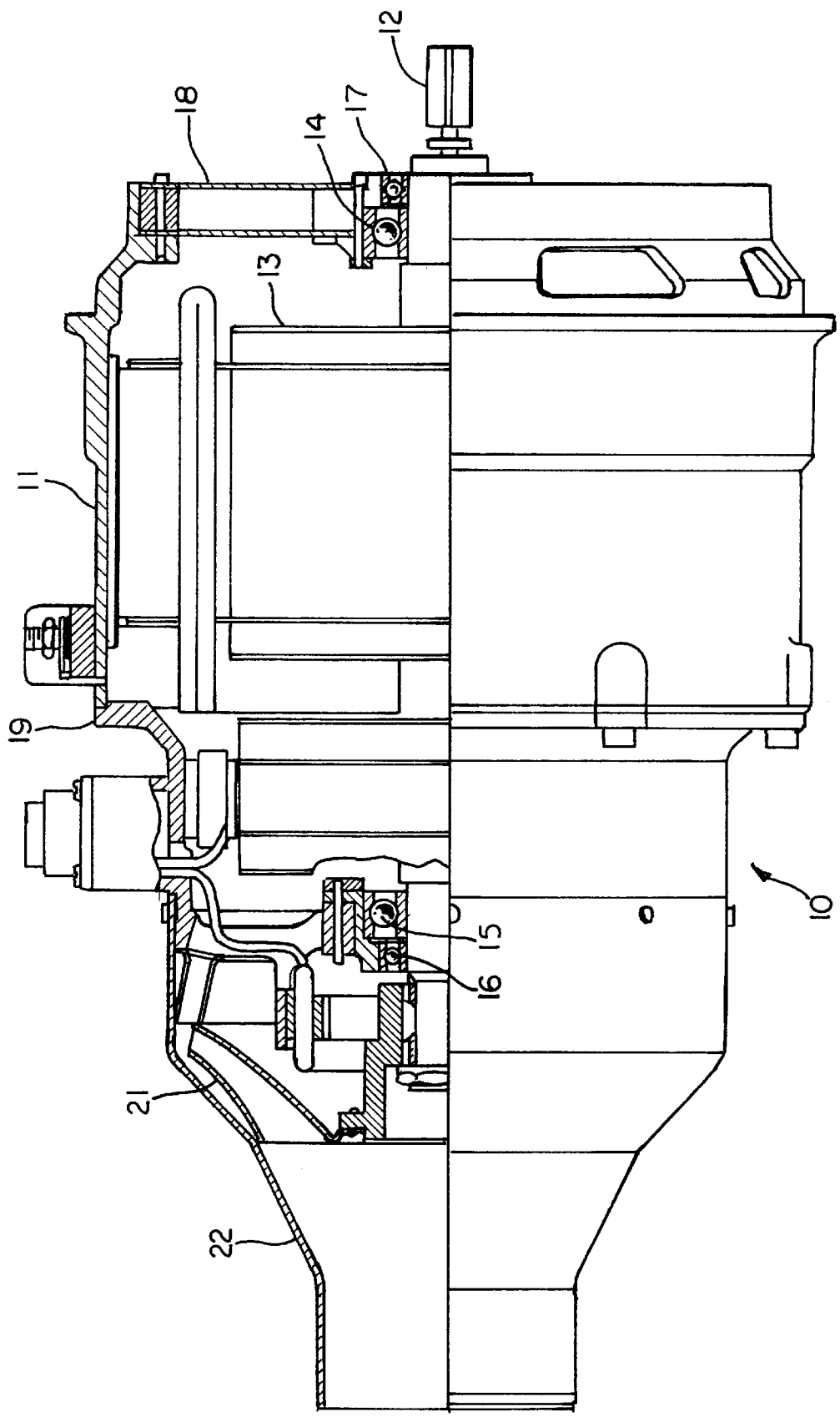
FIG. 1 is a side elevation view, partially in cross-section, of a known generator having primary and auxiliary bearing pairs.

Referring to FIG. 1 there is shown an air-cooled AC generator 10 of a type generally used in many aircraft. The housing, main and auxiliary bearings, stator and rotor of the generator 10 are the same as those in Model 28B421 generators designed and manufactured by AlliedSignal Aerospace Equipment Systems, of Eatontown, N.J. The generator 10 is connected to a main engine by a polygon ended drive shaft 12. The rotor assembly 13 is mounted on the shaft 12 and rotates on main grease lubricated ball bearings 14 and 15, located in housing 11, diaphragm 18 and end bell 19 assembly. The auxiliary bearings 16 and 17 are mounted on the shaft 12 and have a slight gap (FIG. 2) between their outer diameters and bearing liners. Initially only the main bearings support the shaft and the auxiliary bearings have no contact with the bearing liners. A fan 21 for cooling the generator is located on the shaft and is enclosed by the cover 22. When one of the main bearings 14 and 15 have worn significantly, the internal clearance of that bearing increases and its auxiliary bearing touches the liners and starts to support the rotor.

In FIGS. 2a–d there is shown schematically the design of an existing detection system for auxiliary bearing 26. In FIG. 2a, the auxiliary bearing 26 is coaxial with the rotor, main bearing and stator. Under this condition, there is a gap between the auxiliary bearing outer race as seen in FIG. 2b. As the main bearing wears, the shaft and supported auxiliary bearing drift off the central axis as shown in FIG. 2c reducing the gap and eventually contact the housing support region 23, 25. The annular liner 23 has a metal ring 24 electrically insulated between disks 25. The ground wire 27 of a signal lamp in the cockpit is brazed to the ring 24. The ground line remains open until auxiliary bearing 26 touches the ring 24. The auxiliary bearing failure signal light comes on when the ground line is closed inside surface of liner 23. The ring 24 and disks 25 are covered by a thin (0.001 inch) film of insulating material, such as Heresite to protect against false signals as might be created if a foreign metal particle should get into the gap and close the circuit.

Figure 5:
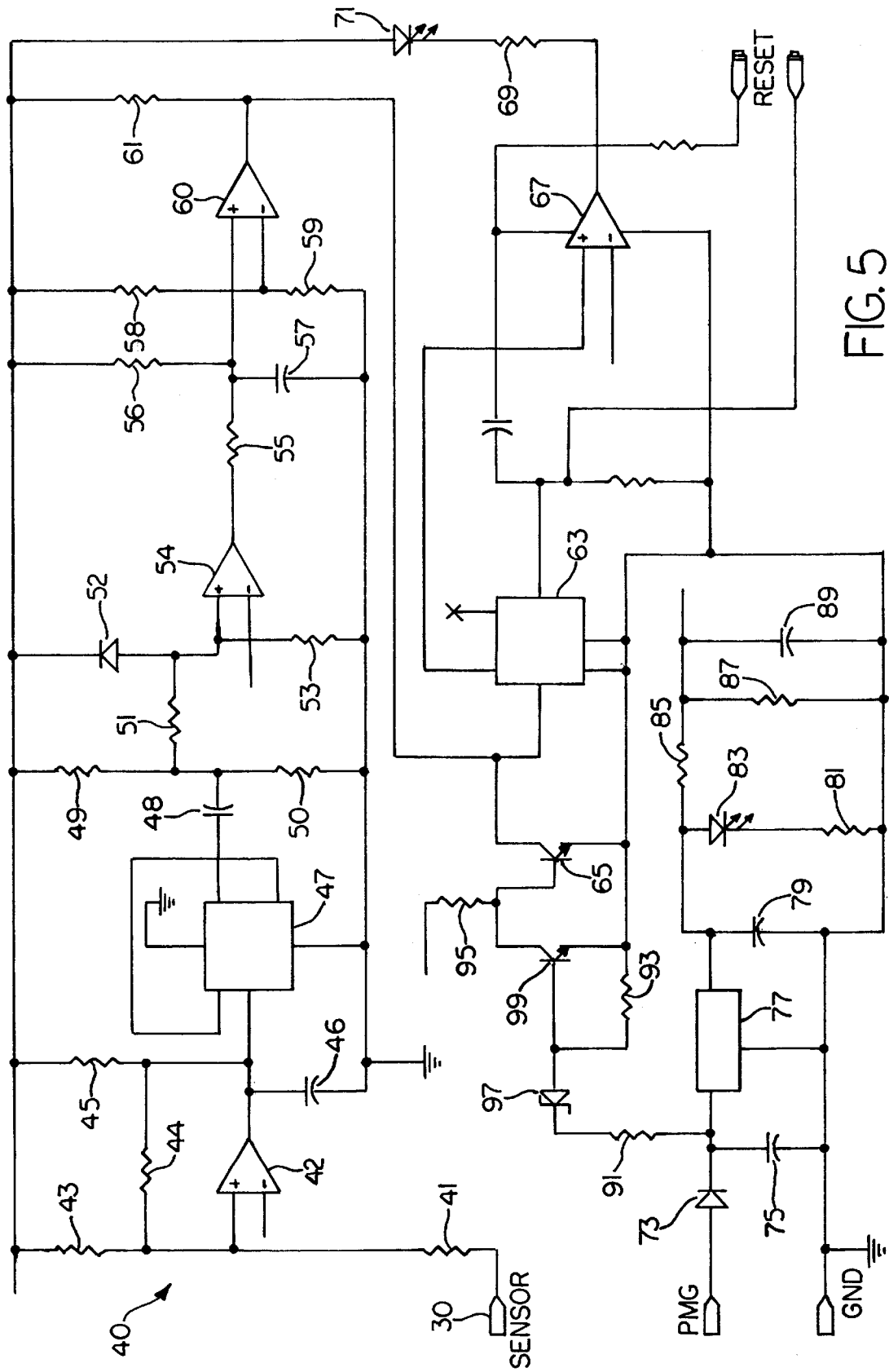
FIG. 5 is a schematic illustration of an alarm circuit suitable for use with the sensor of FIGS. 3 and 4.

An improved bearing wear detection scheme for a rotating machine such as the generator of FIG. 1 is shown in FIGS. 3, 4 and 5. As shown in FIGS. 3 and 4, the auxiliary bearing 29 has an outer race rotation detector is essentially a proximity sensor 30, available commercially, which offers non-contact detection of objects entering the detection range. In this case the object or the target is a coaxial groove 31 on auxiliary bearing outer ring 32. For every turn of the shaft 39, the sensor 30 detects the crossing of the groove 31 and signals the control circuit of FIG. 5 during normal functioning of the main bearing 62. This causes the control circuit to determine the rotation status of the auxiliary bearing outer rings by counting the number of generated pulses. When the main bearings 14 or 15 of FIG. 1 or 62 of FIG. 3 have worn significantly and have reached a predetermined limit, the outer ring of a corresponding auxiliary bearing stops rotating due to contact with the bearing liners 33 and no impulse is generated. The circuit detects this lack of signal and triggers the failure signal to a cockpit dashboard indicator 71 to indicate that the main bearings need replacement.

The aluminum frame 34 with face magnet 35 (commercially available) is mounted on the shaft 39, clamped to inner bearing ring 37 by a specially designed nut 36 and rotates with the shaft. The spacer 38 provides a small clearance between face magnet 35 and auxiliary bearing outer ring 32 so that the magnetic forces synchronize the rotation of both rings 37 and 32 even in case the bearing grease melted and enough friction force is not available to rotate the outer ring 32 together with inner ring 37. This insures that no relative slippage of auxiliary bearing races occurs and the circuit will not trigger a false failure signal of the main bearing. The face magnet 35 also attracts small magnetic foreign particles and keeps them off the sensor 30.

Referring to FIG. 5 there is shown a circuit 40 of the bearing wear detection system in accordance with preferred embodiment of the present invention. The sensor 30 signal to be monitored is connected to resistor 41 through the proximity switch amplifier (not shown). The resistors 43, 44, and 45 in conjunction with the operational amplifier 42 form a waveform discriminator to trim the input waveform into better shape. The capacitor 46 filters out any undesirable noise or pulse. The integrated circuit 47 converts its input signal into a 50 percent duty cycle waveform. The capacitor 48, resistors 49, 50, 51, and 53 with the operational amplifier 54 provide a discharge circuit to discharge capacitor 57 through resistor 55. The resistor 56 controls the current into and the charging rate of the capacitor 57. With the threshold level, corresponding to low level of rotation of the generator, at the divider of resistor 58 and 59, the operational amplifier 60 and the pull up resistor 61 become a decision-making circuit which will trigger the integrated circuit 63 and lock the output when the input level exceeds the threshold and while the transistor 65 is provided in the enabled (OFF) state. The operational amplifier 67, resistor 69 and the indicator 71 form the visible, or alternatively, audible, indication when the auxiliary bearing outer ring 32 touches the liner 33 and stops rotation.

The circuit 40 of FIG. 5 gets power via diode 73 from the PMG (permanent magnet generator) directly so the circuit is active only when the generator is working. The DC power is filtered by capacitor 75 and regulated by integrated circuit 77 to a fixed 5 volt power supply reference level to supply the whole circuit. The capacitor 79 is used for better stability of the regulator chip 77. The resistor 81 and indicator 83 give a visible indication while the power is provided. The resistors 85 and 87, and capacitor 89 generate a global reference for negative inputs of the three operational amplifiers 42, 54 and 60. The resistors 91, 93, 95, zener diode 97, and transistors 99, 65 form a PMG under frequency and/or under voltage discriminator which will disable the function of the main bearing failure detection circuit, while under frequency or under voltage occurs.

From the foregoing, it is now apparent that a novel bearing wear warning scheme has been disclosed, and that numerous modifications may be made. Only one auxiliary bearing and wear detector has been described, but two or more for each machine are typical. Spherical rollers between inner and outer bearing races have been described, however, the invention is applicable to cylindrical or tapered roller or even to sleeve bearings. The auxiliary bearing rotation indicative signals may be generated by optical, magnetic or similar arrangements. Other modifications will be apparent.

What is claimed is:

1. A process of determining when a main bearing has failed in a machine having a stator and a rotor, the rotor journalled for rotation by main bearings and having at least one normallly inoperative auxiliary bearing having an inner race fixed to the rotor and an outer race which rotates with the inner race when inoperative, the auxiliary bearing becoming operable and participating in journalling the rotor upon sufficient wear or failure of one of the main bearings, comprising the steps of:

sensing the periodic rotation of a peripheral indicia on said outer race during machine operation and the proper functioning of said main bearings and generating a signal thereof;

comparing said signal with a predetermined threshold, said threshold corresponding to a level of rotation of said outer race when said auxiliary bearing is journalling said rotor; and providing an alarm indication of a main bearing failure when said signal falls below said predetermined threshold.

2. The process of claim 1, further including the step of weakly coupling the inner and outer races of the auxiliary bearing for co-rotation so long as the auxiliary bearing is inoperative to insure that lubricants or other drag phenomenon do not slow the outer race sufficiently to provide a false alarm indication.

3. The process of claim 2, wherein the step of weakly coupling includes supporting a permanent magnet on one of the auxiliary bearing races in relatively close proximity to the other race to magnetically couple the races together.

4. The process of claim 1, wherein the step of providing an alarm includes generating a pulse train from the signal, reshaping the generated pulse train, utilizing the reshaped pulse train to repeatedly discharge an otherwise continuously charging capacitor, and enabling the alarm upon the charge of the capacitor reaching the predetermined threshold.

5. A bearing system for supporting a shaft within a housing comprising:

at least two primary bearings supporting a shaft;

at least one secondary bearing comprising an inner race supported on the shaft and an outer race normally freely rotatable with the inner race relative to the housing, the outer race engaging the housing and rotatingly supporting the shaft upon failure of a primary bearing;

a sensor for detecting the periodic rotation of a peripheral indicia on said outer race and providing a signal indicative thereof; and indication circuitry responsive to the signal of the sensor and providing an indication of primary bearing failure when the signal falls below a predetermined minimum corresponding to the rotational speed of said outer race when said outer race engages said housing.

6. The bearing system of claim 5, including a second secondary bearing comprising a second inner race supported on the shaft and a second outer race normally freely rotatable with the second inner race relative to the housing, the second outer race engaging the housing and rotatingly supporting the shaft upon failure of another primary bearing;

a second sensor for detecting second outer race rotation and providing a signal indicative thereof;

the indication circuitry responsive to either of the signals of the sensors and providing an indication of primary bearing failure when either signal falls below a predetermined minimum.

7. The bearing arrangement of claim 5, including a permanent magnet coupling the inner and outer races for co-rotation absent primary bearing failure.

8. The bearing arrangement of claim 5, wherein the circuitry includes a wave shaping circuit for reshaping the signal, a capacitor, a charging circuit for supplying a charging current to the capacitor, a discharge circuit for repeatedly discharging the capacitor, and a visible alarm circuit which is enabled when the charge on the capacitor reaches a prescribed value.

9. The bearing arrangement of claim 8, wherein the circuitry further includes a threshold circuit intermediate the capacitor and a visible alarm circuit for sensing the predetermined minimum when the capacitor voltage exceeds a prescribed value.

* * * * *